United States Patent
Nagasawa et al.

(10) Patent No.: US 7,356,714 B2
(45) Date of Patent: Apr. 8, 2008

(54) METHOD OF COMMUNICATING A SIGNAL FROM A SENSOR, CONNECTED TO A CONNECTOR, TO AN AUXILIARY MODULE

(75) Inventors: Kazumi Nagasawa, Aichi (JP); Toshiaki Ozaki, Aichi (JP); Norihito Shimizu, Aichi (JP)

(73) Assignee: Yazaki Corporation, Tokyo (JP)

( * ) Notice: Subject to any disclaimer, the term of this patent is extended or adjusted under 35 U.S.C. 154(b) by 437 days.

(21) Appl. No.: 10/791,785

(22) Filed: Mar. 4, 2004

(65) Prior Publication Data

US 2004/0230320 A1 Nov. 18, 2004

(30) Foreign Application Priority Data

Mar. 5, 2003 (JP) .................... P. 2003-058777

(51) Int. Cl.
*G06F 1/00* (2006.01)
(52) U.S. Cl. ................. 713/300; 713/310; 713/320; 701/54
(58) Field of Classification Search ........... 713/300, 713/320, 324, 330, 310; 701/54
See application file for complete search history.

(56) References Cited

U.S. PATENT DOCUMENTS

| | | | |
|---|---|---|---|
| 5,056,023 A * | 10/1991 | Abe ..................... 701/32 |
| 5,790,419 A | 8/1998 | Matsuda et al. |
| 5,957,985 A * | 9/1999 | Wong et al. ............ 701/33 |
| 6,396,227 B2 * | 5/2002 | Sasaki ................ 318/283 |
| 6,902,433 B1 * | 6/2005 | Hashimoto et al. ..... 439/620.15 |
| 6,972,375 B2 * | 12/2005 | Sugaya et al. .......... 174/117 F |
| 2002/0099487 A1 * | 7/2002 | Suganuma et al. ......... 701/48 |
| 2003/0037542 A1 * | 2/2003 | Xu et al. ................ 60/286 |
| 2003/0129457 A1 * | 7/2003 | Kawai et al. ............. 429/7 |
| 2003/0144784 A1 * | 7/2003 | Tashiro et al. ........... 701/54 |

FOREIGN PATENT DOCUMENTS

| JP | A-5-302544 | 11/1993 |
| JP | A-8-086148 | 4/1996 |
| JP | A-9-101802 | 4/1997 |

* cited by examiner

*Primary Examiner*—Thomas Lee
*Assistant Examiner*—Malcolm D Cribbs
(74) *Attorney, Agent, or Firm*—Morgan, Lewis & Bockius LLP (57) ABSTRACT

An electronic connector connected to a sensor or a switch, and communicating a signal through a common bus includes an I/O unit receiving a signal from the sensor or the switch, a control unit generating a control signal for controlling the driving of a load corresponding to the sensor or the switch according to the signal received from the I/O unit, and a communication unit having a function of decoding the control signal and transmitting the control signal to an equipment connected to the corresponding load through the common bus.

12 Claims, 8 Drawing Sheets

METHOD OF COMMUNICATING A SIGNAL FROM A SENSOR, CONNECTED TO A CONNECTOR, TO AN AUXILIARY MODULE

BACKGROUND OF THE INVENTION

The present invention relates to an intelligent electronic connector incorporating communication, control and input-output functions and/or a drive function and to an auxiliary equipment module.

Figure 10:
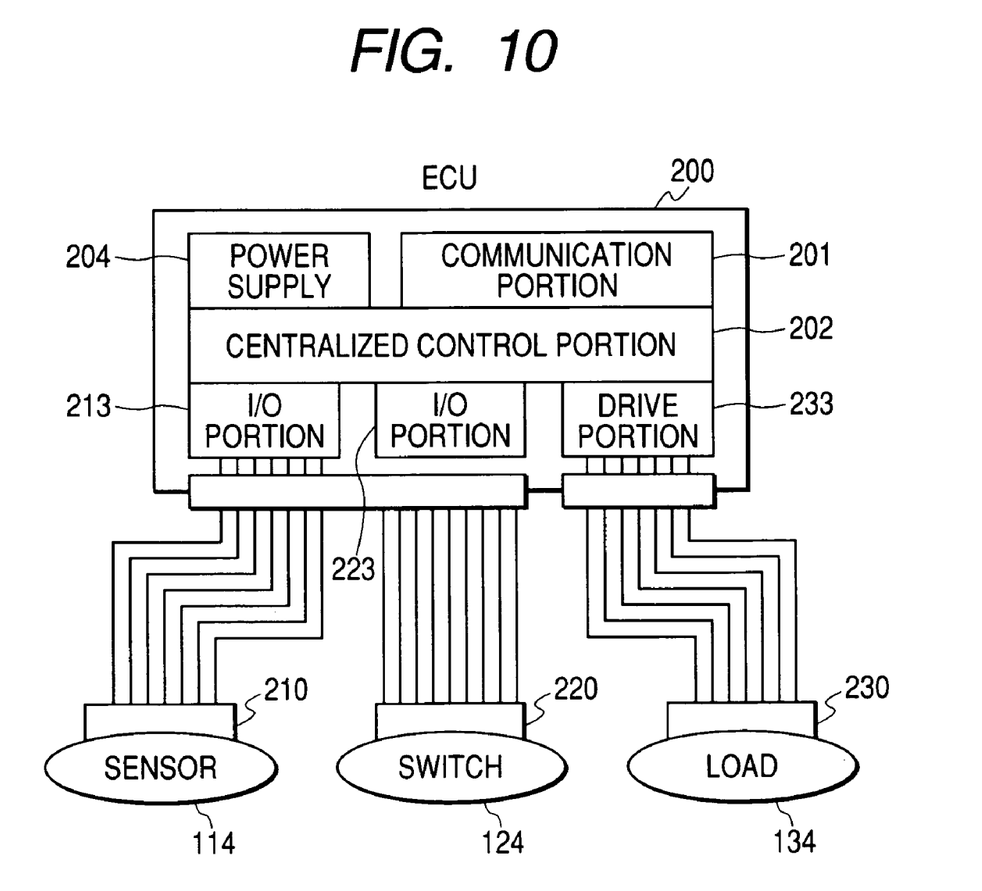
FIG. 10 is a functional block diagram showing an electronic control unit (ECU) for controlling electronic vehicle equipment in the related art.

FIG. 10 is a functional block diagram showing a electronic control unit (ECU) for controlling electronic vehicle equipment in the related art. The ECU shown in FIG. 10 includes a power supply 204, a communication portion 201, a centralized control portion 202, an I/O (input/output) portion 213, an I/O portion 223 and a drive portion 233. The I/O portion 213 is connected via a connector 210 to a sensor 114 by a wire harness. The I/O portion 223 is connected via a connector 220 to a switch 124 by a wire harness. The drive portion 233 is connected via a connector 230 to a load 134 by a wire harness. Although ECUs 200 are mutually connected by way of multiplex communication, the load 134, the switch SW 124 and the like are connected to the ECU 200 by way of non-multiplex communication. Moreover, it has been required to connect each of the sensor 114, the switch SW 124 and the load 134 to the ECU 200 by a wire harness irrespective of the distance therebetween.

As the related art of the invention, JP-A-5-302544 discloses the art of drastically decreasing a processing load on an arithmetic ECU by carrying out various operations independently of one another with respect to input-output interruptions; however, it is not intended to realize saving of wire harness.

The following problems have been presented in vehicle network systems utilizing related ECUs and an ECU of the sort disclosed above.

Firstly, in case that specifications and functions of electronic vehicle equipment (including auxiliary equipment modules) are changed, each wire harness for use in connecting the electronic equipment to the ECU needs changing, whereby the number of kinds and product numbers of wire harnesses tend to increase as well.

Secondly, an increase in the function of electronic vehicle equipment results in not only increasing the number of circuits but also enlarging the wire harness itself, so that an increase in the mass is incurred.

Thirdly, due to centralized control performed by the ECU, the ECU becomes enlarged as a result of an increase in the function of electronic vehicle equipment; the problem is that an increase in the mass (deterioration in fuel efficiency and driving performance) as well as deterioration in roadability is incurred. Moreover, enlargement of software to be loaded in the ECU and an increase in the ECU product number are incurred and this will lead to an increase in the man-hour required for system development and the addition change of the specification.

Fourthly, noise produced from the wire harness affects the load such as a headlamp and a fan motor subjected to PWM (Pulse Width Modulation) by the drive portion of the ECU.

SUMMARY OF THE INVENTION

It is an object of the invention made in view of the foregoing problems to provide an electronic connector and an auxiliary equipment module designed so that while the functions of the related ECU are dispersed into standardized individual functions, a wire harness for use therein can be made simpler and more lightweight by effecting saving of wire.

It is another object of the invention to provide an electronic connector and an auxiliary equipment module capable of flexibly dealing with a change in the function (any difference in specification according to the destination and the grade) of electronic vehicle equipment.

In order to achieve the above object, according to the present invention, there is provided an electronic connector connected to a sensor or a switch, and communicating a signal through a common bus, comprising:

an I/O unit, receiving a signal from the sensor or the switch;

a control unit, generating a control signal for controlling the driving of a load corresponding to the sensor or the switch according to the signal received from the I/O unit; and a communication unit, having a function of decoding the control signal, and transmitting the control signal to an equipment connected to the corresponding load through the common bus.

In the above configuration, no centralized control by an electronic control unit is required when a vehicle network is built by the electronic connector containing an I/O circuit as the I/O unit directly connected to the sensor or the, a control circuit as the control unit, a communication circuit as the communication unit, so that individual sensors and switches are made controllable by the individual electronic connectors. Consequently, any modification resulting from an increase in the number of electronic vehicle equipment as well as its functional improvement is made absorbable by the electronic connector, whereby the electronic control unit, any other electronic connector and wire harness can be least affected thereby.

According to the present invention, there is also provided an electronic connector connected to a load, and communicating a signal through a common bus, comprising:

a communication unit, receiving a control signal for controlling the driving of the load through the common bus;

a control unit, decoding the control signal, and generating a drive signal for driving the load; and a load driving unit, driving the load according to the drive signal.

In the above configuration, no centralized control by an electronic control unit is required when a vehicle network is built by the electronic connector containing a communication circuit as the communication unit, a control circuit as the control unit and a load driving circuit as the load driving unit, so that the load can be driven by the individual electronic connector. Consequently, any modification resulting from an increase in the number of electronic vehicle equipment as well as its functional improvement is made absorbable by the electronic connector, whereby the electronic control unit, any other electronic connector and wire harness can be least affected thereby. Moreover, wire harnessing as a source of noise generation need not be taken into consideration since transmission of the drive signal such as a PWM control signal from the electronic control unit to the load via the wire harness can be dispense with.

Preferably, the load is at least one electronic component out of a plurality of electronic components contained in an auxiliary equipment module.

In the above configuration, no centralized control by the electronic control unit is required when the vehicle network is built by the electronic connector for driving the load within the auxiliary equipment module, so that the load within the auxiliary equipment module is made controllable by the individual electronic connector. Consequently, any modification resulting from an increase in the number of auxiliary equipment modules as well as their functional improvement is made absorbable by the electronic connector, whereby the electronic control unit, any other electronic connector and wire harness can be least affected thereby. Further, the wire harness can be made drastically simpler and more lightweight by effecting saving of wire since the electronic control unit is not required to drive the individual load within the auxiliary equipment module via the wire harness. Moreover, wire harnessing as a source of noise generation need not be taken into consideration since transmission of the drive signal such as a PWM control signal from the electronic control unit to the load via the wire harness can be dispense with.

Preferably, the electronic connector further comprises an I/O unit which receives a signal from at least one sensor or at least one switch out of the plurality of electronic components. The control unit generates the drive signal for driving the load according to the signal received from the I/O unit.

In the above configuration, since the electronic connector contains an I/O circuit as the I/O unit in addition to the a communication circuit as the communication unit, a control circuit as the control unit and a load driving circuit as the load driving unit, the control of the auxiliary equipment is completed only by the auxiliary equipment module and the electronic connector not via the electronic control unit as the control unit within the electronic connector generates the drive signal for driving the load according to the sensor signal and/or the switch signal from the sensor and/or the switch within the auxiliary equipment module.

Here, it is preferable that, the control unit generates a control signal for controlling the driving of a load corresponding to the sensor or the switch according to the signal received from the I/O unit. The communication unit has a function of decoding the control signal. The communication unit transmits the control signal to an equipment connected to the corresponding load through the common bus.

In the above configuration, a sensor and/or a switch as a load nonexistent within the auxiliary equipment module can also be loaded in the auxiliary equipment module since the control unit also generates the control signal for directing the driving/non-driving of the load corresponding to the sensor and/or the switch according to the sensor signal and/or the switch signal received from the I/O unit and the communication unit transmits the control signal elsewhere, whereby design flexibility can be enhanced.

Preferably, the equipment is at least one of the electronic connector, an electronic control unit and an auxiliary equipment module having a function of generating the control signal.

In the above configuration, the control signal can be transmitted from the communication unit to any one of the electronic connector, electronic control unit and auxiliary equipment module having a circuit for generating the control signal.

Preferably, the common bus is a dedicated communication line.

In the above configuration, it is possible to secure reliable communications by providing the dedicated communication line as the common bus.

Preferably, the common bus is a power supply line. The control signal is transmitted while being superposed on the power supply line.

In the above configuration, the power supply line is used as the common bus, so that the wire harness can be made simpler and more lightweight by effecting saving of wire.

According to the present invention, there is also provided an auxiliary equipment module having a plurality of electronic components, and communicating a signal through a common bus, comprising:

a communication unit, receiving a control signal for controlling the driving of at least one load out of the plurality of electronic components;

a control unit, decoding the control signal, and generating a drive signal for driving the load; and a load driving unit, driving the load according to the drive signal In the above configuration, no centralized control by an electronic control unit is required when a vehicle network is built by the auxiliary equipment module containing a communication circuit as the communication unit, a control circuit as the control unit and a load driving circuit as the load driving unit, so that the load can be controlled by the individual auxiliary equipment module. Consequently, any modification resulting from an increase in the number of auxiliary equipment modules as well as their functional improvement is made absorbable by the auxiliary equipment module itself, whereby the electronic control unit, any other electronic connector and wire harness can be least affected thereby. Further, as it is unnecessary for the electronic control unit to drive the individual load within the auxiliary equipment module via the wire harness, the wire harness can be made drastically simpler and more lightweight by effecting saving of wire. Moreover, wire harnessing as a source of noise generation need not be taken into consideration since transmission of the drive signal such as a PWM control signal from the electronic control unit to the load via the wire harness can be dispense with.

Preferably, the auxiliary equipment module further comprises an I/O unit, receiving a signal from at least one sensor or at least one switch out of the plurality of electronic components. The control unit generates the drive signal for driving the load according to the signal received from the I/O unit.

In the above configuration since the auxiliary equipment module contains an I/O circuit as the I/O unit in addition to the a communication circuit as the communication unit, a control circuit as the control unit and a load driving circuit as the load driving unit, the control of the auxiliary equipment is completed only by the auxiliary equipment module not via the electronic control unit as the control unit generates the drive signal for driving the load according to the sensor signal and/or the switch signal from the sensor and/or the switch within the auxiliary equipment module.

Preferably, the control unit generates a control signal for controlling the driving of a load corresponding to the sensor or the switch according to the signal received from the I/O unit. The communication unit has a function of decoding the control signal. The communication unit transmits the control signal to the equipment connected to the corresponding load through the common bus.

In the above configuration, a sensor and/or a switch as a load nonexistent within the auxiliary equipment module can also be loaded in the auxiliary equipment module since the control unit also generates the control signal for directing the driving/non-driving of the load corresponding to the sensor and/or the switch according to the sensor signal and/or the switch signal received from the I/O unit and the communication unit transmits the control signal elsewhere, whereby design flexibility can be enhanced.

Here, it is preferable that the equipment is at least one of the electronic connector, an electronic control unit and an auxiliary equipment module having the function of generating the control signal.

In the above configuration, the control signal can be transmitted from the communication unit to one of the electronic connector, electronic control unit and auxiliary equipment module including a circuit for generating the control signal.

Preferably, the common bus is a dedicated communication line.

In the above configuration, it is possible to secure reliable communications by providing the dedicated communication line as the common bus.

Preferably, the common bus is a power supply line. The control signal is transmitted while being superposed on the power supply line.

In the above configuration, the wire harness can be made simpler and more lightweight by effecting saving of wire as the power supply line is made a common bus.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A detailed description will now be given of an embodiment of the invention by reference to the accompanying drawings.

Figure 1:
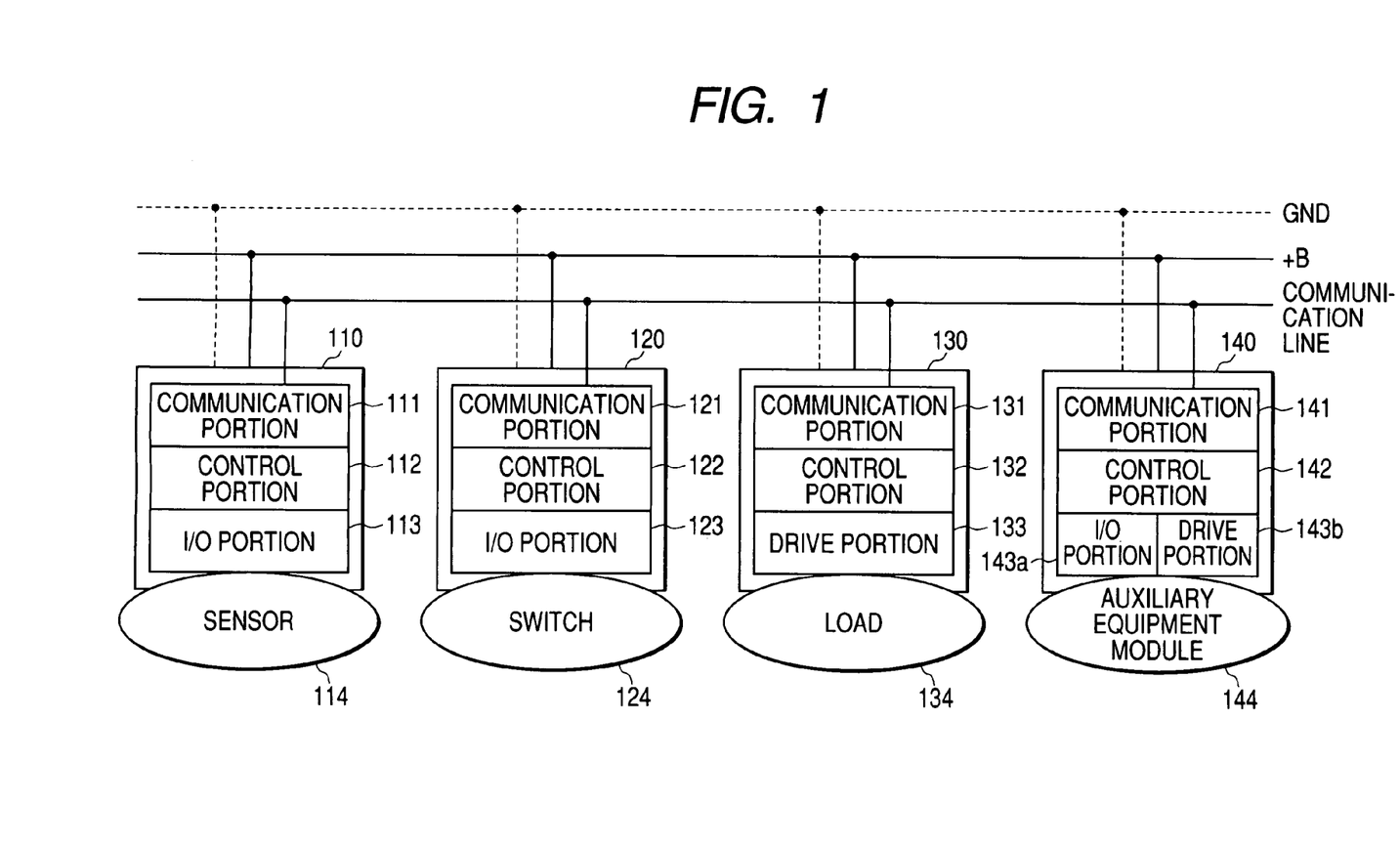
FIG. 1 is a functional block diagram of an electronic connector according to an embodiment of the invention.

FIG. 1 is a functional block diagram showing the basic concept of an electronic connector according to the embodiment of the invention. An electronic connector 110 is directly connected to the connector of a sensor 114. The electronic connector 110 includes a communication portion 111, a control portion 112 and an I/O portion 113 on a built-in electronic board. An electronic connector 120 directly connected to the connector of a switch SW 124 also includes a communication portion 121, a control portion 122 and an I/O portion 123 on a built-in electronic board. An electronic connector 130 directly connected to a load (e.g., a lamp, a motor or the like) includes a communication portion 131, a control portion 132 and a drive portion 133 on a built-in electronic board. Further, an electronic connector 140 directly connected to an auxiliary equipment module 144 includes a communication portion 141, a control portion 142, an I/O portion 143a and a drive portion 143b on a built-in electronic board.

The auxiliary equipment module 144 is a module incorporating auxiliary equipment (e.g., power windows, door locks, outer mirrors, etc.) in order to fulfill any function other than the basic function of a vehicle and is formed with a plurality of electronic components. For example, the auxiliary equipment module for use in actually operating the power window has one motor capable of forward/reverse rotation and two switches at least. Moreover, the auxiliary equipment module 144 may be a module incorporating a plurality of pieces of equipment including headlamps and fog lamps. The auxiliary equipment module in this case has two lamps at least.

Thus, the auxiliary equipment module 144 is formed with a plurality of electronic components (motors, lamps, switches, sensors and so forth) in combination. Of these electronic components, switches and sensors are connected to the I/O portion 143b of the electronic connector 140 and monitored by the control portion 142. Of these electronic components, further, loads such as motors, lamps and the like are connected to and driven by the drive portion 143b of the electronic connector 140. However, the I/O portion 143a of the electronic connector 140 is unnecessary in the absence of sensors and switches.

The communication portions 111, 121, 131 and 141 of the respective electronic connectors communicate control signals by utilizing a communication line or a power supply line so as to keep up communications with any one of other electronic connectors, ECUs or systems. With respect to the communication protocol, LIN (Local Interconnect Network) may be used. From LIN, moreover, it is also possible to keep up communications with equipment over CAN (Control Area Network) and equipment over LIN from there on.

The control portion 112 receives a sensor signal from the sensor 114 such as a sensor for monitoring the state of the load 134, a temperature sensor or the like via the I/O portion 113. The control portion 112 performs the process of appending to the received signal the address of any other electronic connector, ECU or item of system equipment as a signal receiver and feeds the output into the communication portion 111 as a control signal.

When the switch SW 124 is turned on/off by the user, the control portion 122 receives the on/off signal via the I/O portion 123. The control portion 122 performs the process of appending to the received on/off signal the address of any other electronic connector, ECU or item of system equipment as a signal receiver and feeds the output into the communication portion 121 as a control signal.

The control portion 132 receives a control signal for driving the load 134 from any other electronic connector, ECU or item of system equipment via the communication portion 131. The control portion 132 controls the drive portion 133 for driving the load 134 according to the received control signal. The drive portion 133 drives the load 134 such as a lamp, a motor, a speaker or the like by a semiconductor element such as a MOSFET. Moreover, it is possible to control PWM of the load 134 whereby to regulate the motor speed In case that there exist sensors and switches within the auxiliary equipment module 144, the control portion 142 receives a sensor signal and an on/off signal via the I/O portion 143a. When the received sensor and on/off signals are signals for loads within the same auxiliary equipment module 144, the control portion 142 directs the drive portion 143b to drive the loads. When the received sensor and on/off signals are signals for loads nonexistent within the same auxiliary equipment module 144, the control portion 142 performs the process of appending to the received sensor and on/off signals the address of any other electronic connector, ECU or item of system equipment as a signal receiver and feeds the output into the communication portion 141 as a control signal.

In case that there exists a load within the auxiliary equipment module 144, the control portion 142 receives a control signal for driving the load from any other electronic connector, ECU or item of system equipment via the communication portion 141. The control portion 142 controls the drive portion 143b for driving the load according to the received control signal.

Each of the electronic connectors 110-140 is connected to the power supply line (battery line +B) and a GND line. Since the electronic connectors 110-140 are respectively and directly connected to the sensor 114, the switch SW 124, and the load 134 and the auxiliary equipment module 144, the joints between the power supplies and the ground connections are absorbed by the self-contained electronic boards of the respective electronic connectors 110-140. The communication portions 111-141 of the electronic connectors 110-140 are connected to the communication line. In this case, the communication line is unnecessary when a power-supply superposition multiplex system is adopted for communication, so that the communication portions 111-114 are connected to the power supply line.

Figure 2:
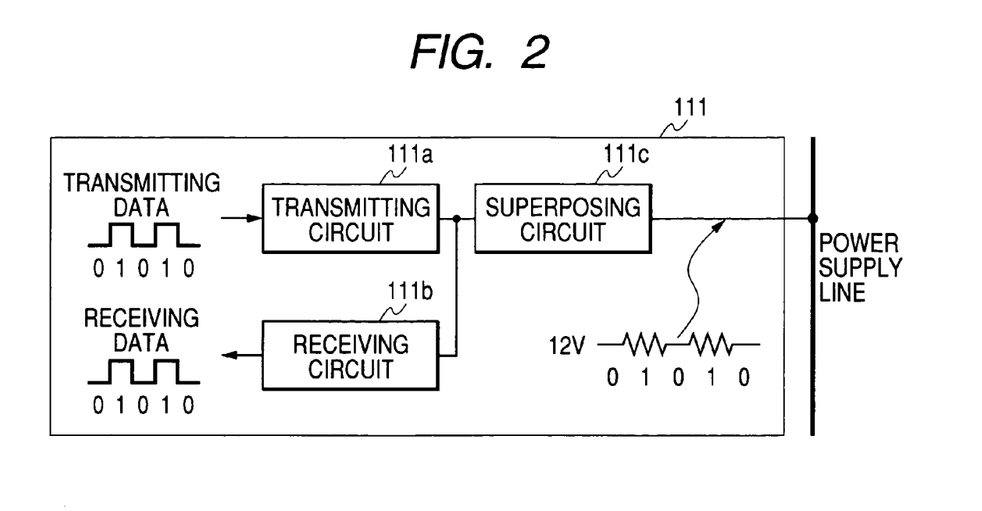
FIG. 2 is a block diagram showing the internal construction of a communication portion on a power-supply superposition multiplex system.

The power-supply superposition multiplex system will now be explained. The power-supply superposition multiplex system is a system for transmitting signals without any special communication line by superposing communications on the power supply line. FIG. 2 is a block diagram showing the internal construction of the communication portion 111 on such a power-supply superposition multiplex system as mentioned above. The communication portion 111 includes a transmitting circuit 111a, a receiving circuit 111b and a superposing circuit 111c.

The transmitting circuit 111a subjects pulsed data transmitted from the control portion 112 to ASK (Amplitude Shift Keying) modulation, for example, and feeds the data into the superposing circuit 111c. The superposing circuit 111c superposes the modulated signal given from the transmitting circuit 111a. Further, the superposing circuit 111c separates the communication signal superposed on the power supply line and feeds the signal into the receiving circuit 111b. The receiving circuit 111b demodulates the signal given from the superposing circuit 111c and feeds the pulsed digital signal as received data into the control portion 112.

Figure 3:
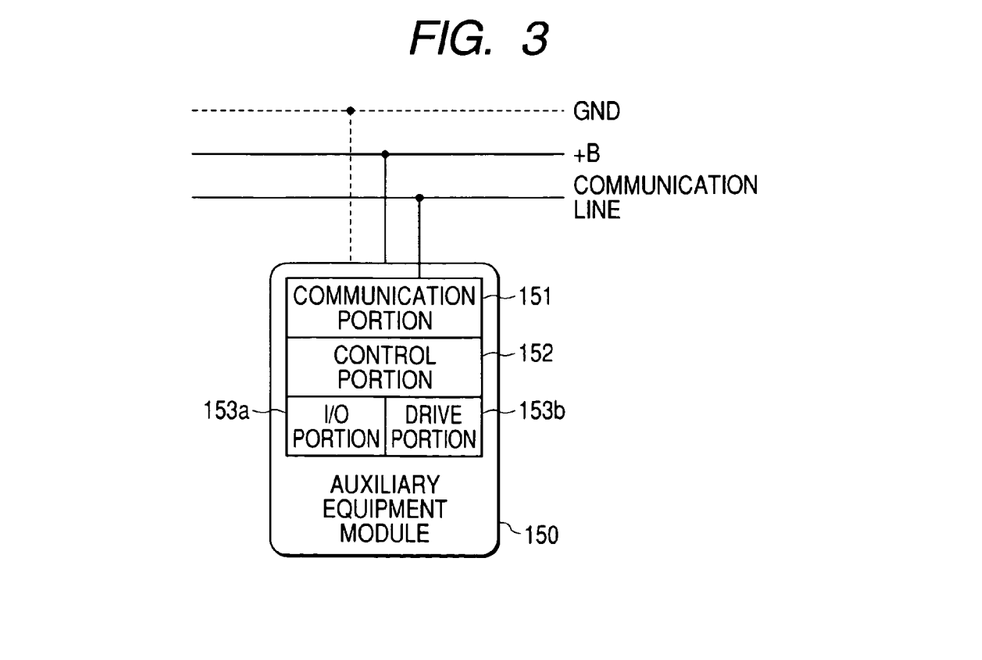
FIG. 3 is a functional block diagram showing the basic concept of an auxiliary equipment module according to the embodiment of the invention.

FIG. 3 is a functional block diagram showing the basic concept of the auxiliary equipment module according to the embodiment of the invention. An auxiliary equipment module 150 according to the embodiment of the invention includes a communication portion 151, a control portion 152, an I/O portion 153a and a drive portion 153b on a built-in electronic board according to the embodiment of the invention. The auxiliary equipment module 150 is connected to a power supply line (battery line +B) and a GND line. The communication portion 151 of the auxiliary equipment module 150 is connected to the communication line. When the power-supply superposition multiplex system is adopted in this case, the communication line is unnecessary.

As the functions of the communication portion 151, the control portion 152, the I/O portion 153a and the drive portion 153b on the electronic board contained in the auxiliary equipment module 150 are similar to those contained in the electronic connector 140, the description thereof will be omitted.

Figure 4:
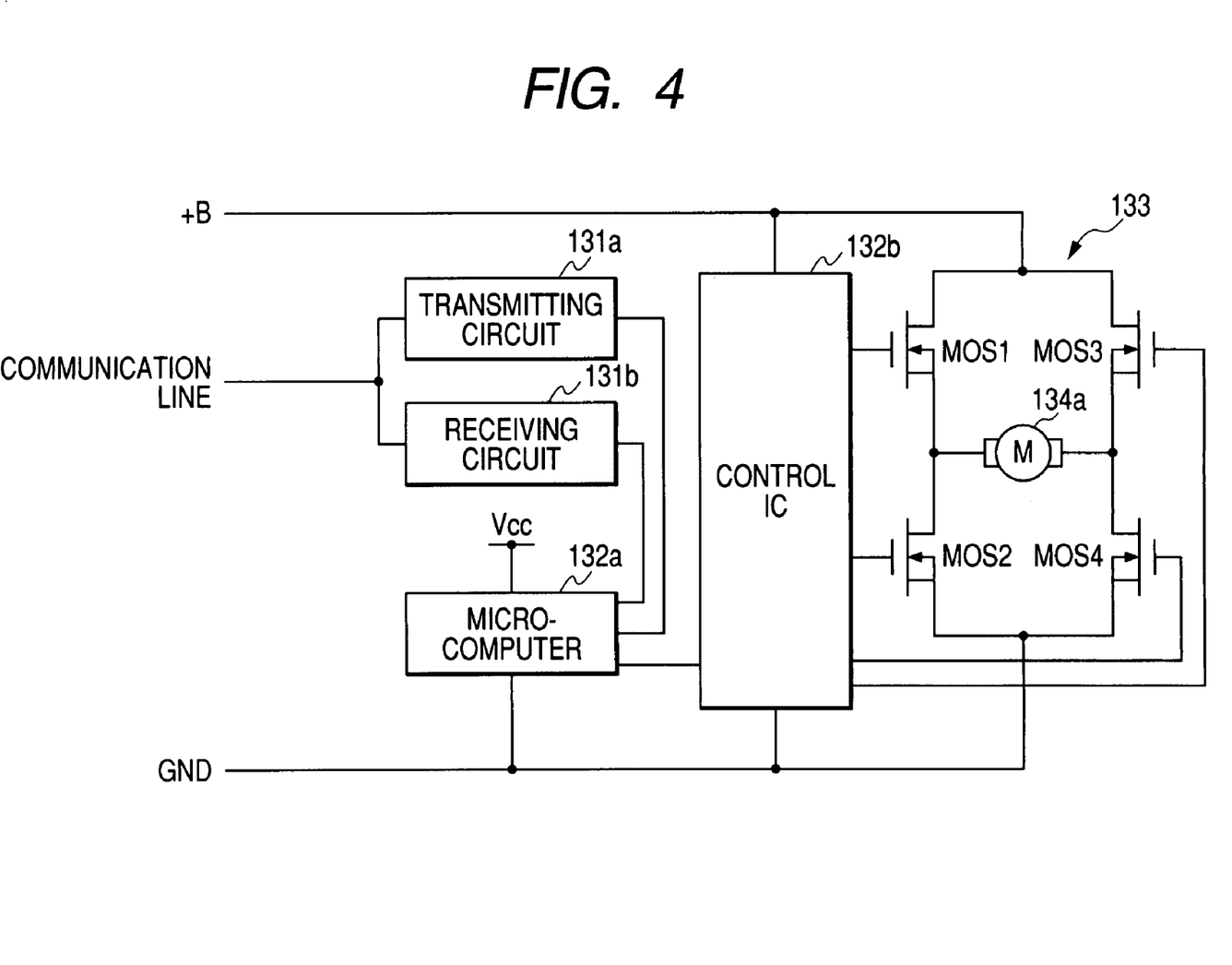
FIG. 4 is an example of a circuit arrangement on the electronic board contained in the electronic connector or the auxiliary equipment module (on a communication line system) according to the embodiment of the invention.

FIG. 4 shows an example of a circuit arrangement on the electronic board contained in the electronic connector or the auxiliary equipment module (on a communication line system) according to the embodiment of the invention. A description will now be given of an electronic connector to be directly connected to a motor 134a by way of example when the load 134 is the motor 134a according to the embodiment of the invention. When the load 134 is a lamp, it can be driven by a single MOS field effect transistor. The electronic connector shown in FIG. 4 includes a transmitting circuit 131a, a receiving circuit 131b, a microcomputer 132a, a control IC 132b and a H bridge circuit 133 constituting of MOS field effect transistors (MOSs 1-4).

The battery power is supplied to the control IC 132b and the H bridge circuit 133 via the power supply line. The transmitting circuit 131a modulates the pulsed digital signal given from the microcomputer 132a and sends out the pulsed digital signal to the communication line. The receiving circuit 131b receives a control signal from the communication line and demodulates the control signal and feeds the demodulated signal to the microcomputer 132a.

The control IC 132b includes a high-side MOS driver (not shown) for driving the MOSs 1 and 3, a charge pump (not shown) for boosting the voltage applied to the high-side MOS driver, and a low-side MOS driver (not shown) for driving the MOSs 2 and 4 so as to control the forward/reverse rotation of the motor 134a. In this case, the transmitting circuit 131a and the receiving circuit 131b shown in FIG. 4 may be incorporated into the control IC 132b and the microcomputer 132a may also be incorporated into the control IC 132b.

The microcomputer 132a decodes the control signal given from the receiving circuit 131b and feeds the control signal into the high-side MOS driver and the low-side MOS driver. Moreover, the microcomputer 132a feeds the control signal into the transmitting circuit 131a when it is needed to transmit the control signal to any other electronic connector or ECU.

The motor 134a rotates forward when the MOSs 1 and 4 of the H bridge circuit 133 are in the ON state and when the MOSs 2 and 3 thereof are in the OFF state. The motor 134a rotates reversely when the MOSs 2 and 3 of the H bridge circuit 133 are in the ON state and when the MOSs 1 and 4 thereof are in the OFF state. Therefore, the high-side MOS driver turns on the MOS 1 and turns off the MOS 3 to rotate the motor 134a forward, whereas the high-side MOS driver turns off the MOS 1 and turns on the MOS 3 to rotate the motor 134a reversely. The low-side MOS driver turns off the MOS 2 and turns on the MOS 4 to rotate the motor 134a forward, whereas the low-side MOS driver turns on the MOS 2 and turns off the MOS 4 to rotate the motor 134a reversely.

When it is needed to control the speed of the motor 134a, a PWM control circuit (not shown) includes in the control IC 132b. The PWM control circuit is provided at the preceding stage of the high-side MOS driver and the low-side MOS driver and supplies a PWM waveform having any given duty ratio to the high-side MOS driver and the low-side MOS driver.

Figure 5:
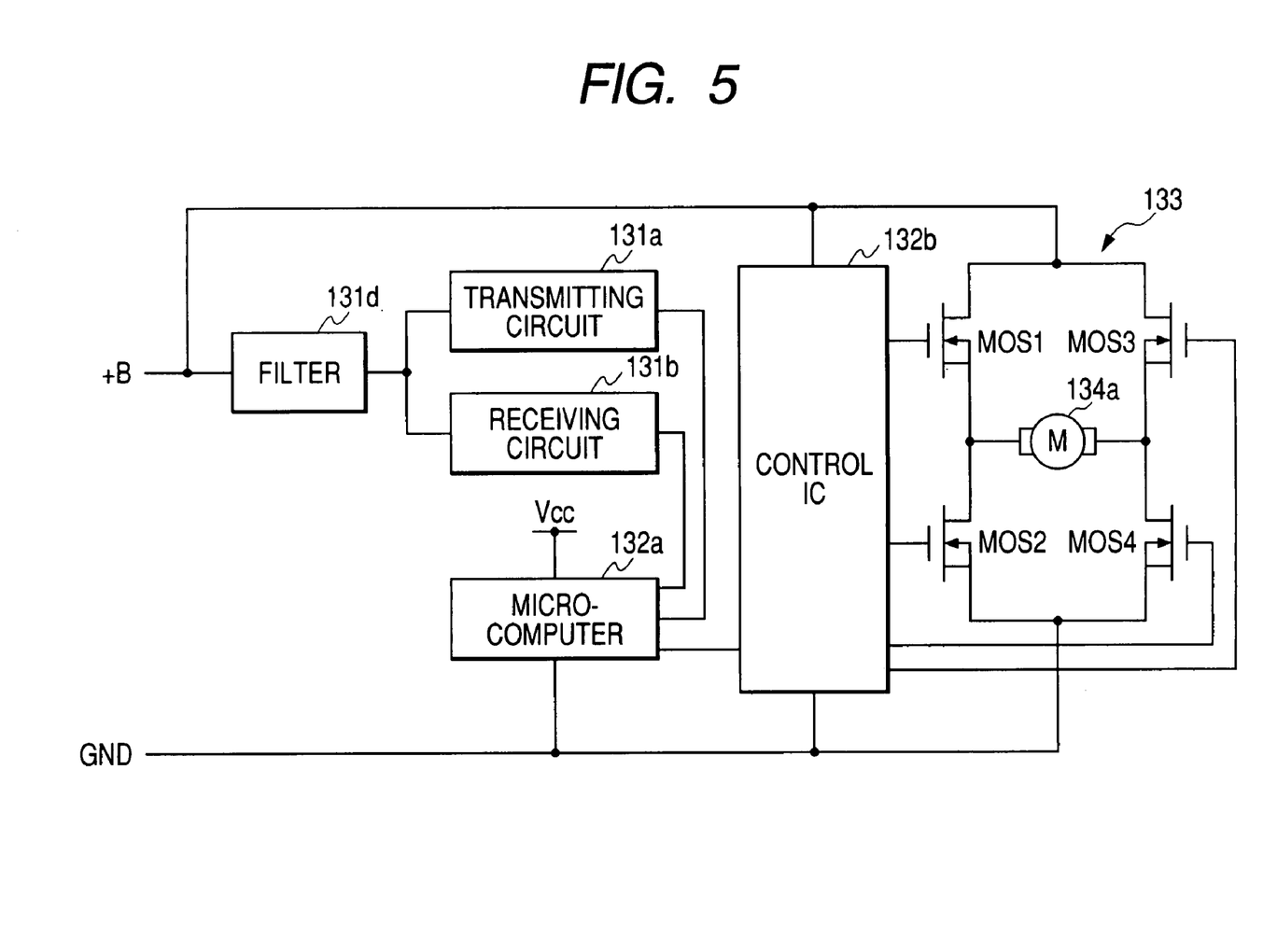
FIG. 5 is an example of a circuit arrangement on the electronic board contained in the electronic connector or the auxiliary equipment module (on a communication line system) according to the embodiment of the invention.

FIG. 5 shows an example of a circuit arrangement on the electronic board contained in the electronic connector or the auxiliary equipment module (on the power-supply superposition multiplex system) according to the embodiment of the invention. The electronic connector shown in FIG. 5 includes a transmitting circuit 131a, a receiving circuit 131b, a filter 131d, a microcomputer 132a, a control IC 132b and a H bridge circuit 133 constituting of MOS field effect transistors (MOSs 1-4).

The filter 131d is a band pass filter for filtering a band in which control signals superposed on the power supply line are carried. The filter 131d feeds the signal in the band subjected to filtering into the receiving circuit 131b. As the rest of elements are similar to those in the case of the communication line system, the description thereof will be omitted.

Figure 6:
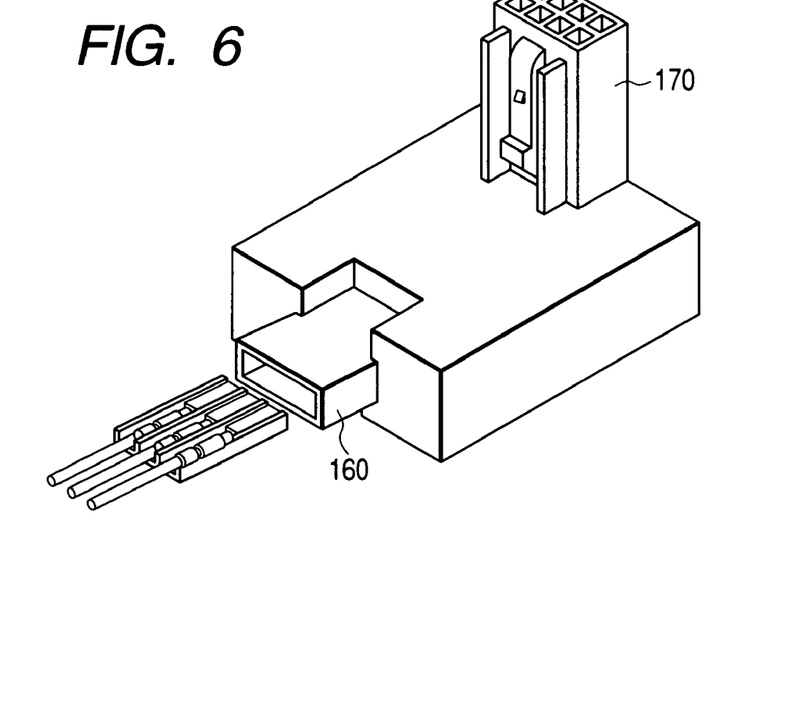
FIG. 6 is a schematic perspective view of an electronic connector (on the communication line system) according to the embodiment of the invention.

FIG. 6 is a schematic perspective view of an electronic connector (on the communication line system) according to the embodiment of the invention. The electronic connector is an example of the electronic connector 140 connected to the auxiliary equipment module 144. The electronic connector 140 includes a socket 160 into which three wire harnesses respectively for a power supply line, a GND line and a communication line are fitted. The electronic connector 140 and the auxiliary equipment module 144 are connected by jointly fitting the pins of the auxiliary equipment module 144 into the socket 170 of the electronic connector 140. Though the electronic connector 140 is shaped as shown in FIG. 6 by way of example but may be varied in shape with the auxiliary equipment module 144. In the electronic connector 140, an electronic board mounted with an IC (ASIC or the like) and a semiconductor switching element is contained.

Figure 7:
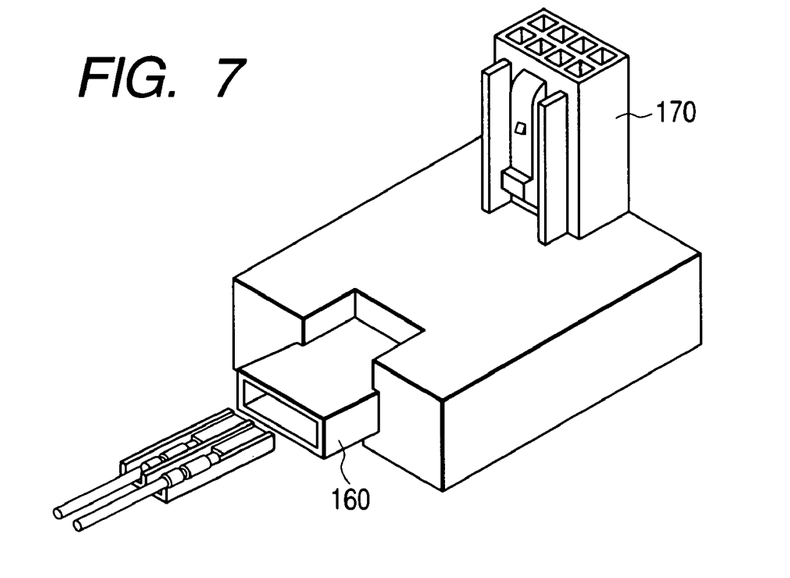
FIG. 7 is a schematic perspective view of an electronic connector (on the power-supply superposition multiplex system) according to the embodiment of the invention.

FIG. 7 is a schematic perspective view of an electronic connector (on the power-supply superposition multiplex system) according to the embodiment of the invention. The electronic connector 140 includes a socket 160 into which two wire harnesses respectively for a power supply line and a GND line are fitted. As the rest of elements are similar to those in the case of the communication line system, the description thereof will be omitted. Heretofore, about 10 wire harnesses have been required because each of the electronic components within the auxiliary equipment module 144 is wired up to the ECU thereby; however, the use of the electronic connector according to the invention allows the number of wire harnesses to be reduced to two or three.

Figure 8:
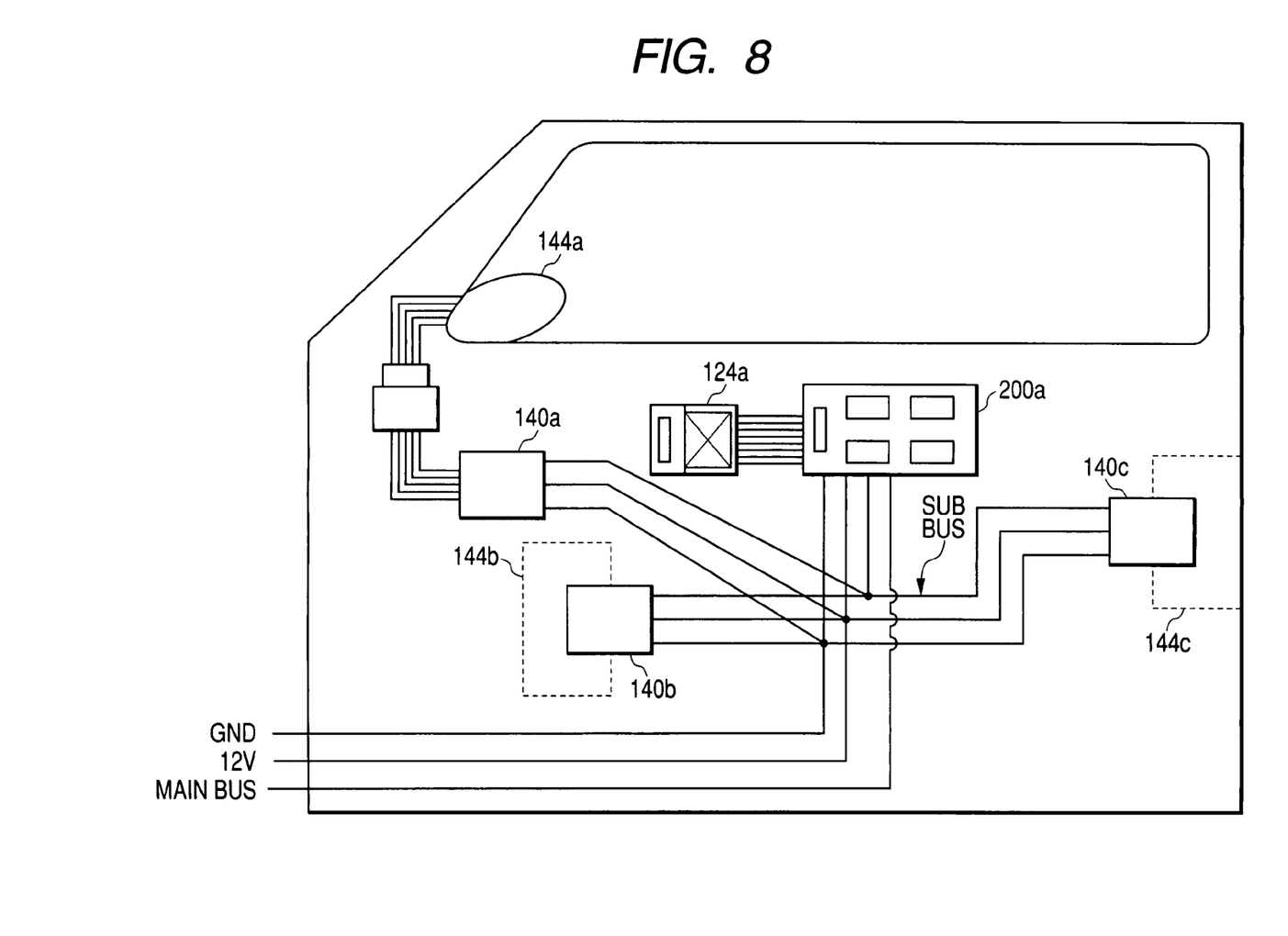
FIG. 8 is a diagram showing an example (on the communication line system) when the electronic connector according to the embodiment of the invention is applied to a door system.

Applications of the electronic connector as stated above will be described next. FIG. 8 is a diagram showing an example (on the communication line system) when the electronic connector according to the embodiment of the invention is applied to a door system. The door system includes an ECU 200a of one piece, power window master switch type, a mirror switch 124a, an outer mirror module 144a, an electronic connector 140a for a mirror, a power window module 144b, an electronic connector 140b for a power window, a door lock module 144c and an electronic connector 140c for a door lock.

The ECU 200a has a gateway function with respect to a main bus (e.g., using CAN and BEAN. (Body Electronics Area Network)) for communicating with any equipment other than the door system and a subbus (e.g., using LIN within the door system). Moreover, the ECU 200a is connected to the mirror switch 124 by a wire harness. Incidentally, the mirror switch 124a may also be integrated with the ECU 200a.

The electronic connector 140a for the mirror, the electronic connector 140b for the power window and the electronic connector 140c for the door lock are connected with one another via a power supply line, a GND line and a communication line so as to form the subbus and are also connected to the ECU 200a.

Communication from the ECU 200a to each of the electronic connectors 140a-140c is conducted by the subbus and communications from the ECU 200a to any equipment other than the door system is conducted by the main bus. Each electronic connector is capable of communication with the ECU 200a via the subbus and with any equipment other than the door system via the main bus.

The electronic connector 140b for the power window and the electronic connector 140c for the door lock are directly coupled to the power window module 144b and the door lock module 144c, respectively. Although the electronic connector 140a for the mirror is not directly coupled to the outer mirror module 144a but coupled thereto via a wire harness, the length of the wire harness can be made shorter than that of the wire harness from the related ECU.

However, an outer mirror module containing an electronic board equipped with a communication portion 151, a control portion 152, an I/O portion 153a and a drive portion 153b, a power window module containing the electronic board and a door lock module containing the electronic board may be used in place of the outer mirror module 144a, the electronic connector 140a for the mirror, the power window module 144b, the electronic connector 140b for the power window, the door lock module 144c and the electronic connector 140c for the door lock.

Figure 9:
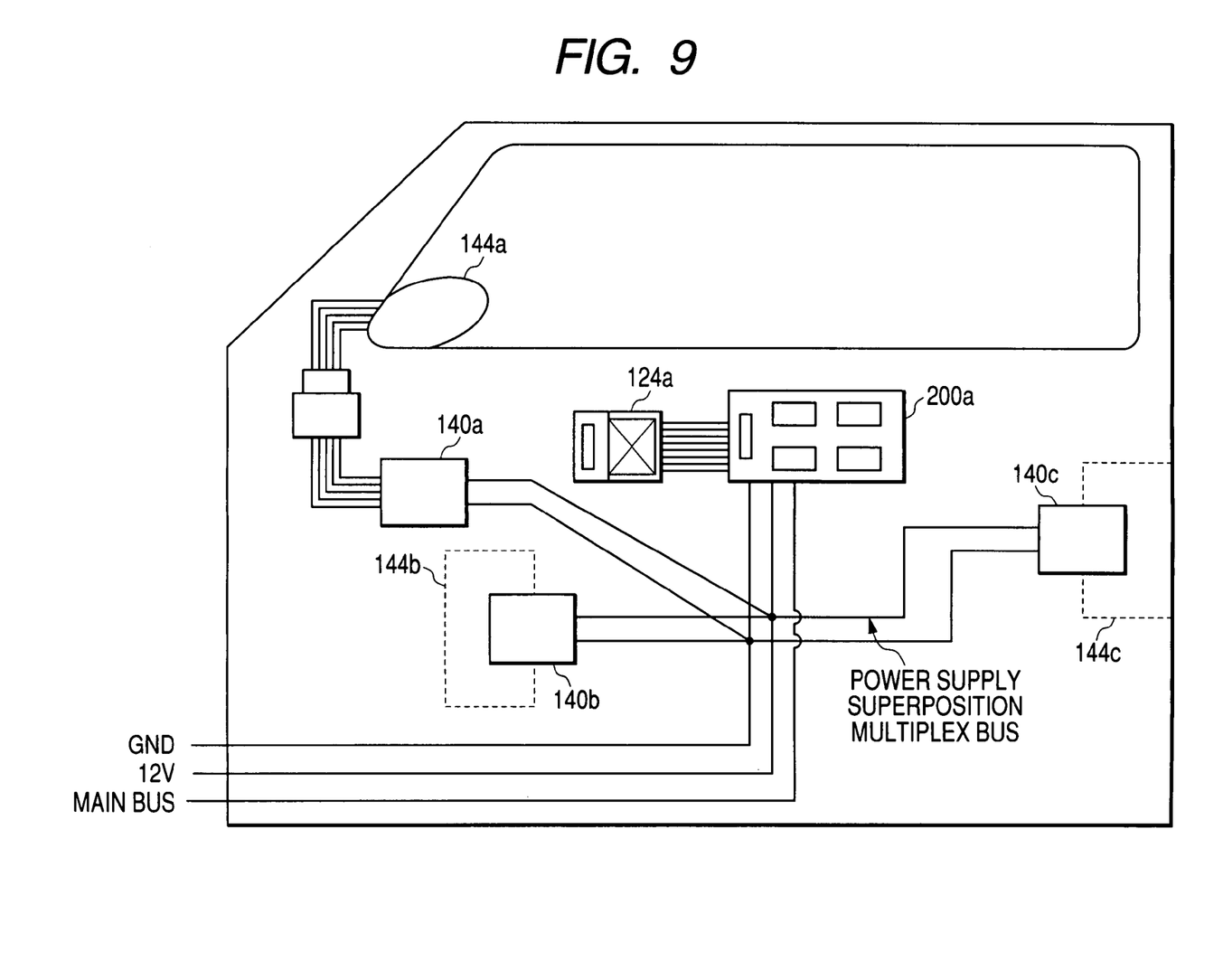
FIG. 9 is a diagram showing an example (on the power-supply superposition multiplex system) when the electronic connector according to the embodiment of the invention is applied to a door system.

FIG. 9 is a diagram showing an example (on the power-supply superposition multiplex system) when the electronic connector according to the embodiment of the invention is applied to a door system. The door system of FIG. 9 differs from the door system of FIG. 8 in that the transmission and reception of control signals through the communication line are superposed on the power supply line. As the rest of elements are similar to those in the case of the communication line system, the description thereof will be omitted.

Although the invention has been described in its preferred form with a certain degree of particularity, it is understood that the invention is not limited to the specific embodiment thereof and various modifications may be made in the invention without departing from the spirit and scope thereof.

What is claimed is:

1. An electronic connector connected to a sensor or a switch, and communicating a signal through a common bus, comprising:

an I/O unit, receiving a signal from the sensor or the switch;

a control unit, generating a control signal for controlling the driving of a load corresponding to the sensor or the switch according to the signal received from the I/O unit; and a communication unit, having a function of decoding the control signal, and transmitting the control signal to an equipment connected to the corresponding load through the common bus.

2. The electronic connector as set forth in claim 1, wherein the equipment is at least one of the electronic connector, an electronic control unit and an auxiliary equipment module having a function of generating the control signal.

3. The electronic connector as set forth in claim 1, wherein the common bus is a dedicated communication line.

4. The electronic connector as set forth in claim 1, wherein the common bus is a power supply line; and wherein the control signal is transmitted while being superposed on the power supply line.

5. An electronic connector connected to a load, and communicating a signal through a common bus, comprising:
   a communication unit, receiving a control signal for controlling the driving of the load through the common bus;
   a control unit, decoding the control signal, and generating a drive signal for driving the load; and
   a load driving unit, driving the load according to the drive signal.

6. The electronic connector as set forth in claim 5, wherein the load is at least one electronic component out of a plurality of electronic components contained in an auxiliary equipment module.

7. The electronic connector as set forth in claim 6, further comprising an I/O unit which receives a signal from at least one sensor or at least one switch out of the plurality of electronic components, wherein the control unit generates the drive signal for driving the load according to the signal received from the I/O unit.

8. The electronic connector as set forth in claim 7, wherein the control unit generates a control signal for controlling the driving of a load corresponding to the sensor or the switch according to the signal received from the I/O unit;
   wherein the communication unit has a function of decoding the control signal; and
   wherein the communication unit transmits the control signal to an equipment connected to the corresponding load through the common bus.

9. The electronic connector as set forth in claim 5, wherein the equipment is at least one of the electronic connector, an electronic control unit and an auxiliary equipment module having a function of generating the control signal.

10. The electronic connector as set forth in claim 5, wherein the common bus is a dedicated communication line.

11. The electronic connector as set forth in claim 5, wherein the common bus is a power supply line; and
   wherein the control signal is transmitted while being superposed on the power supply line.

12. The electronic connector as set forth in claim 5, further comprising:
   a housing that contains the communication unit and the control unit, the communication unit comprises a transmitting circuit and a receiving circuit and the control unit comprises an electronic board mounted integrated circuit and a semiconductor switching element with an input and an output;
   a power supply line attachment site in electrical communication with the electronic board mounted integrated circuit and the semiconductor switching element input;
   a ground line attachment site in electrical communication with the electronic board mounted integrated circuit and the semiconductor switching element; and
   at least one drive signal attachment site in electrical communication with the semiconductor switching element output.

* * * * *